United States Patent
Zabaleta et al.

(10) Patent No.: US 8,844,761 B2
(45) Date of Patent: Sep. 30, 2014

(54) RESEALABLE BEVERAGE CONTAINERS AND METHODS OF MAKING SAME

(76) Inventors: Daniel A. Zabaleta, Cooper City, FL (US); Sam Hackett, Ft. Lauderdale, FL (US)

( * ) Notice: Subject to any disclaimer, the term of this patent is extended or adjusted under 35 U.S.C. 154(b) by 0 days.

(21) Appl. No.: 13/572,404

(22) Filed: Aug. 10, 2012

(65) Prior Publication Data
US 2014/0041338 A1     Feb. 13, 2014

(51) Int. Cl.
*B65D 41/32* (2006.01)
*B65D 35/24* (2006.01)

(52) U.S. Cl.
CPC ............... *B65D 41/32* (2013.01); *B65D 35/24* (2013.01); *Y10S 220/906* (2013.01)
USPC ........ 220/711; 220/254.8; 220/270; 220/277; 220/267; 220/260; 220/266; 220/906; 222/81; 222/541.2

(58) Field of Classification Search
CPC ........ B65D 35/24; B65D 39/08; B65D 39/00; B65D 41/32; B65D 17/18
USPC .............. 220/277, 711, 254.8, 270, 267, 260, 220/265, 266, 906; 222/81, 541.2
See application file for complete search history.

(56) References Cited

U.S. PATENT DOCUMENTS

| | | |
|---|---|---|
| 2,112,231 A | 5/1936 | Speidel |
| 2,303,205 A | 11/1942 | Frankenberg |
| 2,426,550 A | 3/1945 | Coyle |
| 2,384,810 A | 9/1945 | Calleson |
| 3,026,507 A | 3/1962 | Blosser |
| 3,176,872 A | 4/1965 | Zundel |
| 3,191,564 A | 6/1965 | Fraze |
| 3,225,957 A | 12/1965 | Huth |
| 3,255,917 A | 6/1966 | Fraze |
| 3,303,960 A | 2/1967 | Fraze |
| 3,349,949 A | 10/1967 | Brown |
| 3,361,291 A | 1/1968 | Fraze |
| 3,439,640 A | 4/1969 | Fraze |
| 3,439,833 A | 4/1969 | Fraze |
| 3,446,389 A | 5/1969 | Brown |
| 3,480,175 A | 11/1969 | Khoury |
| 3,638,597 A | 2/1972 | Brown |
| 3,643,833 A | 2/1972 | Fraze |
| 3,726,432 A | 4/1973 | Gentile |
| 3,752,353 A | 8/1973 | Slade |

(Continued)

FOREIGN PATENT DOCUMENTS

| | | |
|---|---|---|
| CA | 476789 | 9/1951 |
| EP | 0414249 A2 | 2/1991 |

(Continued)

*Primary Examiner* — Elizabeth Volz
(74) *Attorney, Agent, or Firm* — Allen D. Hertz, P.A.; Allen D. Hertz

(57) ABSTRACT

Resealable beverage containers include caps that are twisted to impart translational motion of the cap to push a tear panel into the container. Cam elements are used to convert rotational movement to translational movement. The caps are preferably made of molded plastic material, and include cam elements formed on the sidewalls of the caps that engage cam followers or projections formed on the inner cylindrical surface of a socket which is formed in the lid of the beverage container. Methods of manufacturing resealable beverage containers avoid the need to form rivets and to attach pull tabs, thus saving costs and making the beverage containers more easily recycled.

35 Claims, 14 Drawing Sheets

(56) References Cited

U.S. PATENT DOCUMENTS

| | | | |
|---|---|---|---|
| 3,795,342 | A | 3/1974 | Ashton |
| 3,844,443 | A | 10/1974 | Cudzik |
| 3,856,184 | A | 12/1974 | Luviano |
| 3,871,314 | A | 3/1975 | Stargell |
| 3,880,318 | A | 4/1975 | Fraze |
| 3,910,453 | A | 10/1975 | Kneusel |
| 3,924,777 | A | 12/1975 | Peyser |
| 3,938,693 | A * | 2/1976 | Patel et al. ............... 222/81 |
| 3,967,752 | A | 7/1976 | Cudzik |
| 4,042,144 | A | 8/1977 | Henning |
| 4,116,360 | A | 9/1978 | McKernan |
| 4,116,361 | A | 9/1978 | Stargell |
| 4,122,971 | A | 10/1978 | Potts |
| 4,182,460 | A | 1/1980 | Holk |
| 4,262,815 | A | 4/1981 | Klein |
| 4,286,728 | A | 9/1981 | Fraze |
| 4,386,713 | A | 6/1983 | Baumeyer |
| 4,399,925 | A | 8/1983 | Fundom |
| D273,846 | S | 5/1984 | Fraze |
| 4,567,746 | A | 2/1986 | Bachmann |
| 4,574,975 | A | 3/1986 | Taylor |
| 4,685,849 | A | 8/1987 | LaBarge et al. |
| 4,705,186 | A | 11/1987 | Barrash |
| 4,711,611 | A | 12/1987 | Bachmann |
| 4,793,510 | A | 12/1988 | Arfert |
| RE32,927 | E | 5/1989 | Taylor et al. |
| 4,872,597 | A | 10/1989 | Hanafusa |
| 5,052,576 | A | 10/1991 | Budenbender |
| 5,248,053 | A | 9/1993 | Lundgren |
| 5,292,025 | A | 3/1994 | Dubreul |
| 5,293,765 | A | 3/1994 | Nussbaum-Pogacnik |
| 5,356,030 | A | 10/1994 | Budenbender |
| 5,421,480 | A | 6/1995 | Cudzik |
| 5,622,208 | A | 4/1997 | Vinson |
| 5,692,633 | A | 12/1997 | Gordon |
| 5,711,447 | A | 1/1998 | Plester |
| 5,713,235 | A | 2/1998 | Diekhoff |
| 5,718,352 | A | 2/1998 | Diekhoff |
| 5,778,723 | A | 7/1998 | Diekhoff |
| 5,779,086 | A | 7/1998 | Barrash |
| 5,785,198 | A | 7/1998 | Credle |
| 5,816,428 | A | 10/1998 | Plester |
| 5,822,843 | A | 10/1998 | Diekhoff |
| 6,010,026 | A | 1/2000 | Diekhoff |
| 6,010,028 | A | 1/2000 | Jordan |
| 6,082,944 | A | 7/2000 | Bachmann |
| 6,105,807 | A | 8/2000 | McCrossen |
| 6,206,222 | B1 | 3/2001 | Cudzik |
| 6,216,904 | B1 | 4/2001 | Cagan |
| 6,234,338 | B1 | 5/2001 | Searle |
| 6,332,551 | B1 | 12/2001 | Copeland |
| 6,450,358 | B1 | 9/2002 | Berro |
| 6,460,723 | B2 | 10/2002 | Nguyen |
| 6,575,325 | B2 | 6/2003 | Dickie |
| 6,609,634 | B2 * | 8/2003 | De Laforcade et al. .......... 222/1 |
| 6,626,314 | B1 | 9/2003 | McHenry et al. |
| 6,651,833 | B2 | 11/2003 | Sciarini |
| 6,739,471 | B2 | 5/2004 | Goetz et al. |
| 6,779,677 | B2 | 8/2004 | Chupak |
| 6,877,941 | B2 | 4/2005 | Brifcani |
| 6,889,862 | B2 | 5/2005 | Vaughan |
| 6,910,598 | B2 | 6/2005 | Gotz et al. |
| 7,014,060 | B2 | 3/2006 | Richardson |
| D559,680 | S | 1/2008 | Jacober et al. |
| 7,823,740 | B2 | 11/2010 | Perra |
| 7,841,222 | B2 | 11/2010 | Cook et al. |
| 7,891,517 | B2 | 2/2011 | Simmons |
| 7,918,359 | B2 | 4/2011 | Paris et al. |
| 7,918,363 | B2 * | 4/2011 | Morabito et al. ............. 220/705 |
| 8,215,513 | B1 | 7/2012 | Grissom |
| 8,336,728 | B2 | 12/2012 | Forrest et al. |
| 2001/0040167 | A1 | 11/2001 | Flecheux |
| 2002/0030053 | A1 | 3/2002 | Copeland |
| 2003/0116521 | A1 | 6/2003 | Chupak |
| 2004/0159662 | A1 | 8/2004 | Johnson |
| 2004/0256386 | A1 | 12/2004 | LaFortune |
| 2005/0029264 | A1 | 2/2005 | Werth |
| 2005/0115969 | A1 | 6/2005 | Mizuma |
| 2005/0127077 | A1 | 6/2005 | Chupak |
| 2005/0150889 | A1 | 7/2005 | Perra |
| 2005/0279746 | A1 | 12/2005 | Hsu |
| 2007/0045318 | A1 | 3/2007 | Gibson |
| 2008/0053997 | A1 | 3/2008 | Perra |
| 2008/0099480 | A1 | 5/2008 | Chang |
| 2008/0110922 | A1 | 5/2008 | Sines |
| 2009/0026201 | A1 | 1/2009 | Hall et al. |
| 2009/0045158 | A1 | 2/2009 | Suriol |
| 2009/0200306 | A1 | 8/2009 | Breunig |
| 2009/0261101 | A1 | 10/2009 | Forrest |
| 2010/0126992 | A1 | 5/2010 | Phillips |
| 2010/0133275 | A1 | 6/2010 | Phillips |
| 2010/0294768 | A1 | 11/2010 | Ramsey et al. |
| 2010/0320207 | A1 * | 12/2010 | Sjogren et al. ................ 220/270 |
| 2011/0036839 | A1 | 2/2011 | Gardner |
| 2011/0036840 | A1 | 2/2011 | Zakai |
| 2011/0062106 | A1 | 3/2011 | Akveld |
| 2011/0100946 | A1 | 5/2011 | Perra |
| 2011/0226636 | A1 | 9/2011 | Petti |
| 2011/0232423 | A1 | 9/2011 | Raymond |
| 2012/0037631 | A1 | 2/2012 | Weist |
| 2012/0273490 | A1 | 11/2012 | Jensen |
| 2013/0082055 | A1 | 4/2013 | Ramsey et al. |
| 2013/0200034 | A1 | 8/2013 | Kaanta |

FOREIGN PATENT DOCUMENTS

| | | |
|---|---|---|
| EP | 2212215 B1 | 2/2012 |
| WO | WO 2011025327 A2 | 3/2011 |
| WO | WO 2011124552 A1 | 10/2011 |

* cited by examiner

RESEALABLE BEVERAGE CONTAINERS AND METHODS OF MAKING SAME

CROSS-REFERENCE TO RELATED APPLICATIONS

This application does not claim the benefit of any provisional or previously filed U.S. or foreign applications.

BACKGROUND OF THE INVENTION

1. Field of the Invention

The present invention relates to resealable beverage containers and methods of making same. In particular, and according to one aspect of the invention, a beverage container such as an aluminum can is provided with a cap that is twisted by the consumer to open the can. The twist or rotational movement of the cap is converted into linear motion by a cam mechanism to drive the cap into opening action, whereby a frangible sealing tab is pushed into the can. Once the can is opened, the cap can be reverse-twisted to remove it from the opening, and then after drinking, the consumer can twist the cap back into a sealing position within the opening.

2. Description of the Related Art

The beverage and can industries have long sought to create a can that is both economical to produce and convenient for use by consumers. In the past, beverage cans were provided with a "pull tab" which the consumer would grab by a ring, and pull until the tab was removed from the can. This created a problem in that the tab became disposable waste for which the consumer was responsible to ensure proper disposal. Often the consumer failed to properly dispose of the tab, thereby creating not only litter, but also a safety issue, in that the tabs could be swallowed by small children. Moreover, the edges of the pull tab were sharp enough that they could, if mishandled, cut the fingers or hands of the consumer or anyone else who handled a loose pull tab. As a result of these problems, the industry moved in the direction of a tab that stayed on the can after opening, thereby preventing both litter and any sharp edges from coming into contact with consumers.

The present state of the art is to have a "stay on" tab that is attached to the can lid by a rivet formed in the can lid next to the opening. The opening is formed by a score line, or frangible "kiss cut" which breaks when the tab is pulled up by the consumer. The score line, when broken, produces a hinged flap that stays connected to the can lid, but inside the can.

Beverage cans with stay on tabs suffer from at least the following deficiencies. First, they are not resealable, so that once the consumer opens the beverage, the contents are subject to loss of carbonation, and the influx of foreign material due to the contents being open to the surrounding environment. Secondly, in order to form the rivet which is used to secure the stay on tab to the beverage lid, the lid needs to be made of a different material, typically an aluminum alloy that is stronger than the aluminum alloy used to make the sides and bottom of the can. Further, the tab itself is typically made of a different alloy than the sides and lid, reflecting the need for a still stronger, typically heavier material. As a result, recycling of the aluminum beverage can is problematic because the different materials need to be separated. The use of three different materials also tends to add weight, and expense, to the finished container.

A need exists for improved beverage containers that are resealable, cost effective to produce, and "green" in terms of avoiding waste and facilitating the recycling of aluminum cans. Concurrently, a need exists for improved methods for manufacturing beverage containers that result in faster production time, lower production costs, and improved products.

SUMMARY OF THE INVENTION

A beverage can has a sidewall and integrally formed bottom. A top lid includes a socket integrally formed therein which includes a substantially cylindrical sidewall and a bottom wall. A score line formed in the bottom wall defines tab which forms an opening into the can when the score line is broken. A cap is fitted in the socket and has a sidewall which is formed with cam surfaces. The cam surfaces cooperate with detents formed in the cylindrical sidewall of the socket, so that when the cap is twisted or rotated through a sufficient number of radians, or angle of motion, the cam surfaces translate rotational motion into linear motion, driving the cap downwardly into the socket. As the cap moves downwardly, a protrusion formed on the lower surface of the cap impinges on the periphery of the score line, thereby pushing the tab into the can.

Once opened, the cap can be discarded if the entire contents of the can are consumed. Alternatively, the cap can be re-fitted into the socket, so that the cam surfaces engage the detents, and rotated to achieve a sealing position, whereby the contents of the can are protected from the ambient atmosphere. This will result in the prevention of spillage, the loss of carbonation, and the prevention of foreign objects from entering the can.

Preferably, the beverage container is a "can," but the same principals described above could be used for other types of beverage containers, including bottles made of various materials, including plastic, paper, metal (such as aluminum), cartons, cups, glasses, etc. In one particularly preferred embodiment, the beverage container is an aluminum can, and lid is made of the same aluminum alloy material as the sidewall of the can. The cap is preferably made of plastic material of sufficient hardness that the cam surfaces do not deform during opening and closing operations.

The cap may be a separate implement, sold separately from the beverage container, and re-used after washing. Also, caps with different features may be provided, such as a cap that has a child's sip cup top, so that the beverage can be converted into a child's sip cup. Other implements can be envisioned, including a cap that has a baby bottle "nipple" formation to convert the beverage can into a baby bottle. In such an embodiment, the contents of the beverage can could be infant formula.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
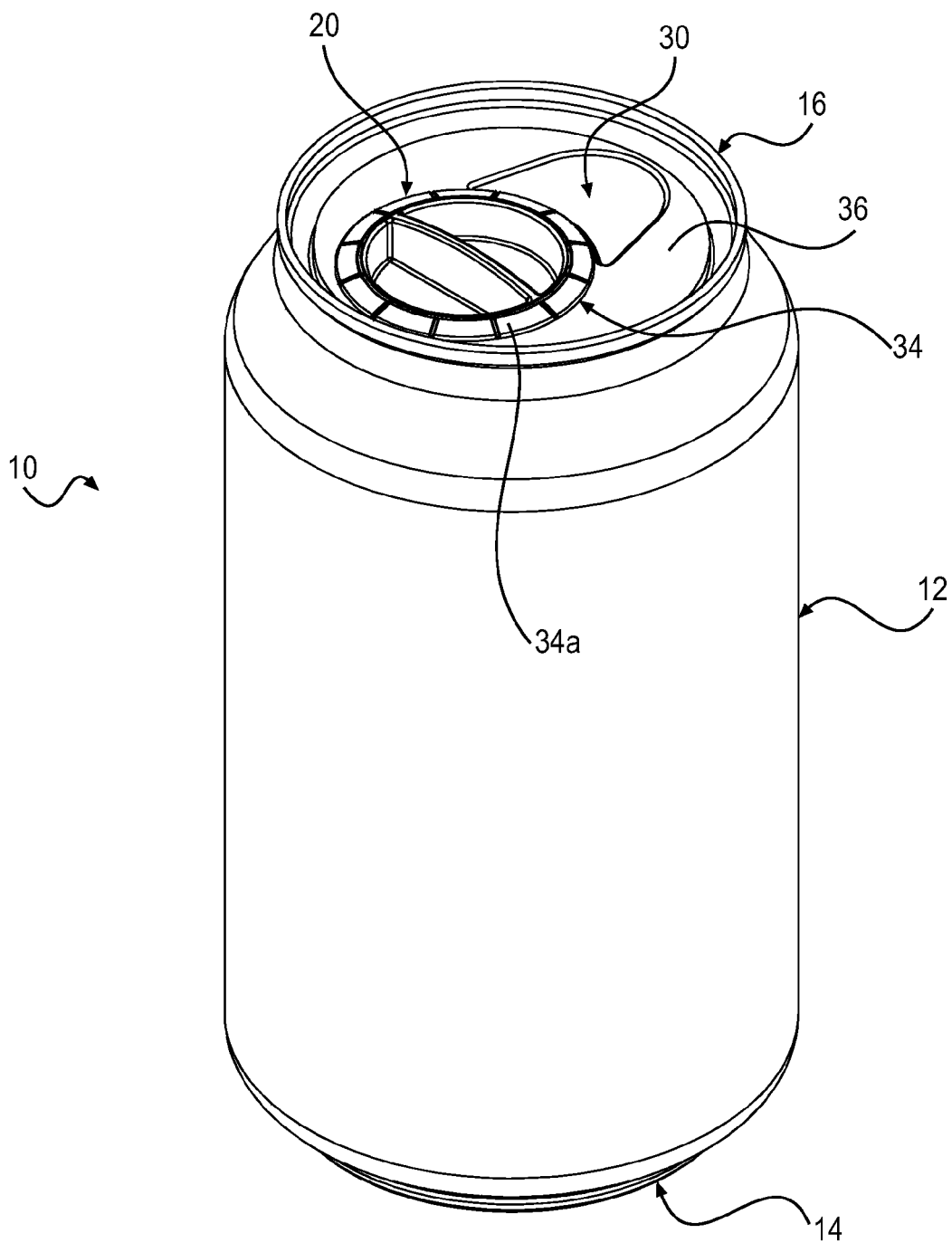
FIG. 1 is a side elevation view showing an example of a beverage container according to the present invention.

Referring to FIGS. 1 through 12, a beverage container 10 includes a cylindrical sidewall 12, a closed bottom wall 14, integrally formed with the sidewall 12 and a lid 16 connected to the sidewall 12 at the end opposite the bottom wall 14. In the illustrated embodiment, the beverage container is a can, wherein the bottom wall 14 and the sidewall 12 are formed from a single piece of aluminum material, using otherwise known processes. The aluminum material is a light weight aluminum alloy commonly used in the beverage can industry. The lid 16 is preferably made of the same light weight aluminum alloy material, and is joined at the upper end of the sidewall through likewise known processes. The lid 16 includes a cylindrical socket 18 which extends downwardly into the beverage container 10 from an upper wall 17. The socket 18 is formed near a peripheral edge or lip of the lid 16 as is customary in the art, to allow drinking from the beverage container 10. A cap 20 fits into the socket 18 and engages same in a manner described in more detail below. The cylindrical sidewall 12 of the beverage container 10 is preferably tapered at both the upper and lower ends to provide greater structural integrity, particularly for use with pressurized contents, such as when used for carbonated beverages.

The lid 16 has an outer perimeter that is connected to the upper open end of the sidewall 12 of the beverage container, using known processes, to form an enclosure which contains a beverage. Beverages contained therein are not limited, but include carbonated or non-carbonated beverages, and could also include foodstuffs, and non-edible products. The socket 18 is integrally formed in the upper wall 17 of the lid 16 and includes a cylindrical sidewall 22, which extends downwardly into the beverage container 10, and a bottom wall 24. A score line 26 is formed in the bottom wall 24 in order to create a flap or tear panel 25 (see FIGS. 13B, 13C and 13D) which is pushed into the can when the can is opened. In the opened position, the tear panel 25 remains connected to the bottom wall 24 due to the fact that the score line 26 does not make a complete circle or loop; a hinge 28 is created where the bottom wall 24 is not scored (see FIG. 5).

Figure 9:
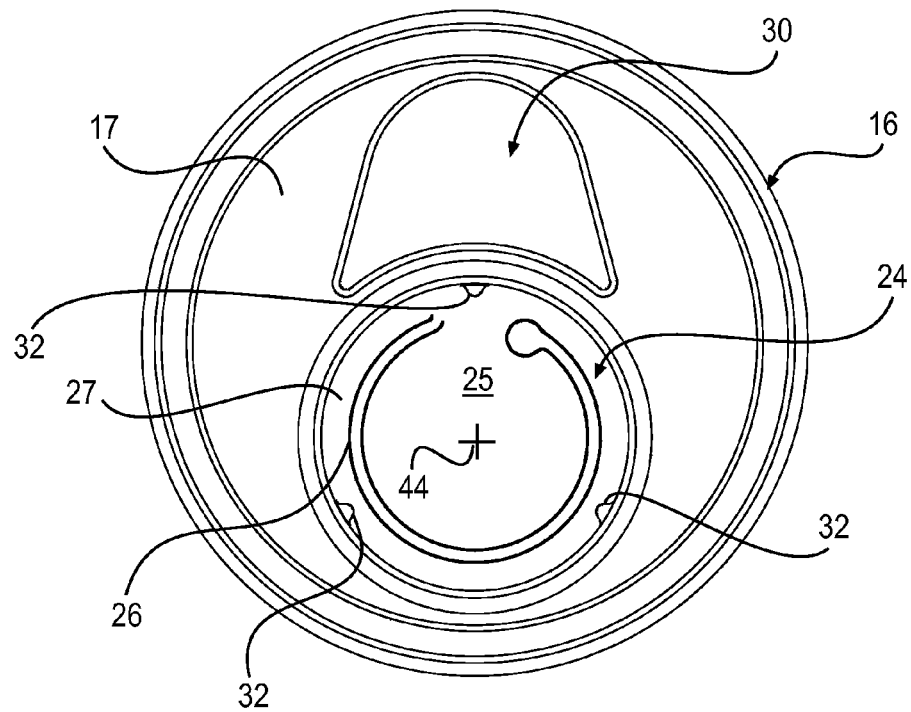
FIG. 9 is a top view of the beverage container of FIG. 8, with the cap removed, showing the projections inside the socket for engaging cam surfaces.

As seen in figures, the cap 20 is sized to fit substantially within the socket 18, and includes a flat annular surface 21 which is disposed between the cam shaped bottom surface 38 and the cap's cylindrical sidewall 40. In FIG. 9, the bottom wall 24 of the socket 18 may include a flat annular surface 27 which is disposed between the socket sidewall 22 and the circular score line 26. When assembled and in the "resealed" position shown in FIG. 13D, the flat annular surface 21 of the cap 20 comes into contact with the annular surface 27 of the bottom of the socket 18 to effectively reseal the container 10.

The lid 16 has a shallow, elongated U-shaped depression 30 which serves two purposes. First, the depression 30 acts as a stiffening structure to provide greater strength to the lid 16. This is particularly advantageous if the lid 16 is to be made of the same aluminum alloy as the sidewall 12 and bottom wall 14 of the container 10. Secondarily, the depression 30 adds a familiar look to consumers who are accustomed to the prior art beverage containers employing a pull tab that is operated first in an opening direction, and then secondly, in a seated direction, where the hinged pull tab is positioned after opening.

Figure 2:
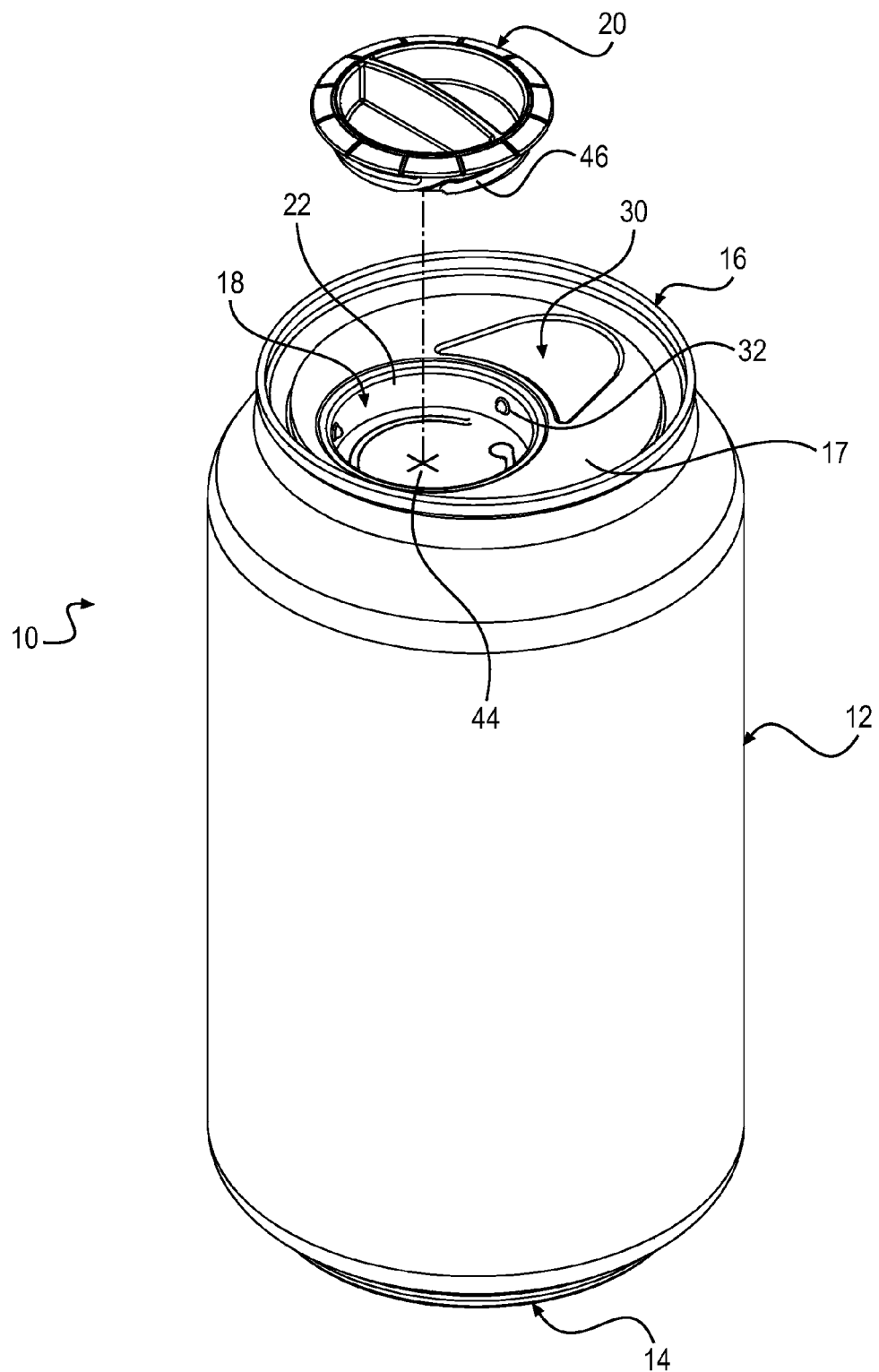
FIG. 2 is a side elevation view, similar to FIG. 1, but exploded to reveal the cap and socket features of the beverage container.
Figure 3:
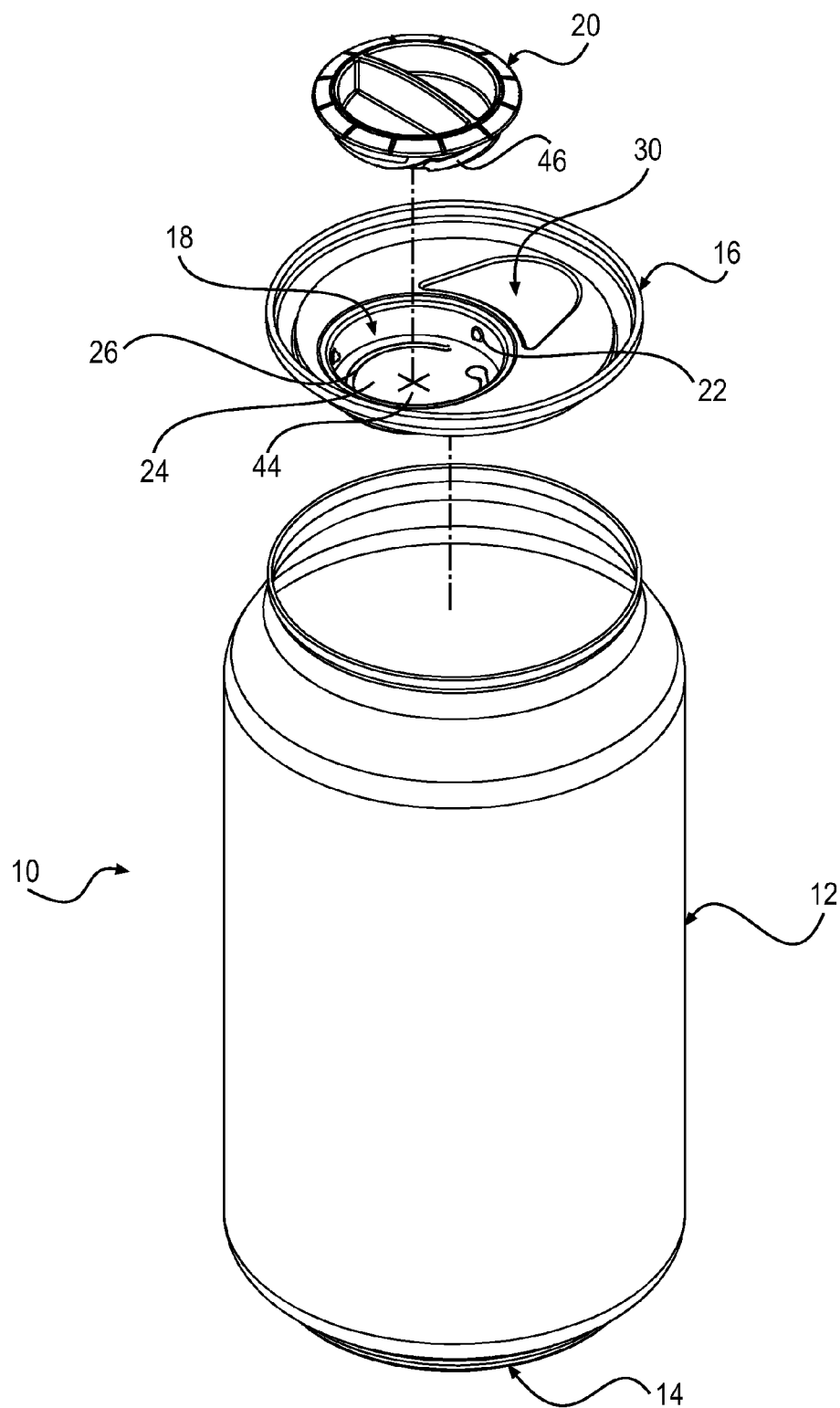
FIG. 3 is a side elevation view, similar to FIGS. 1 and 2, but further exploded to reveal the lid of the beverage container.
Figure 4:
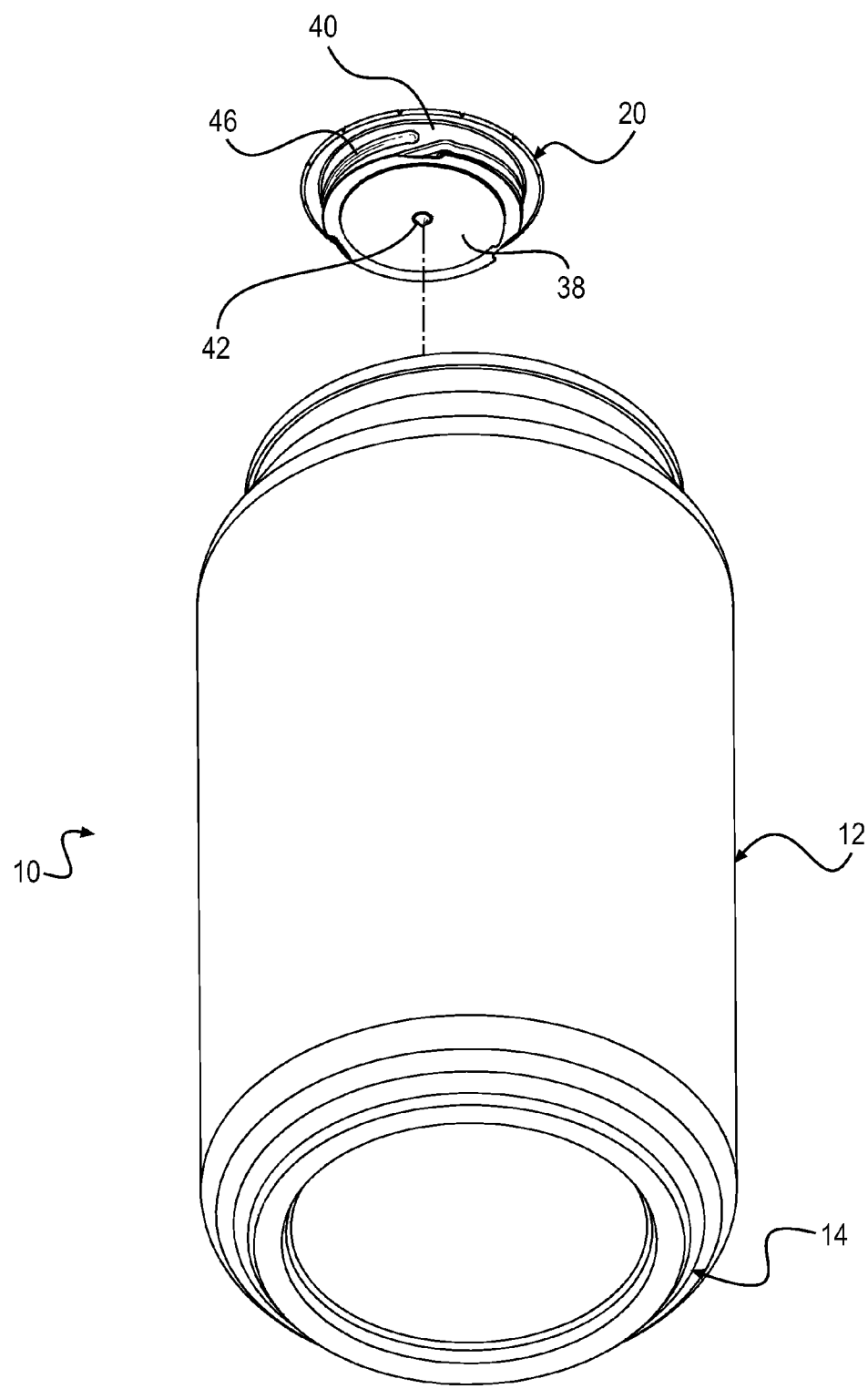
FIG. 4 is an exploded, bottom elevation view of the beverage container of FIGS. 1-3.
Figure 5:
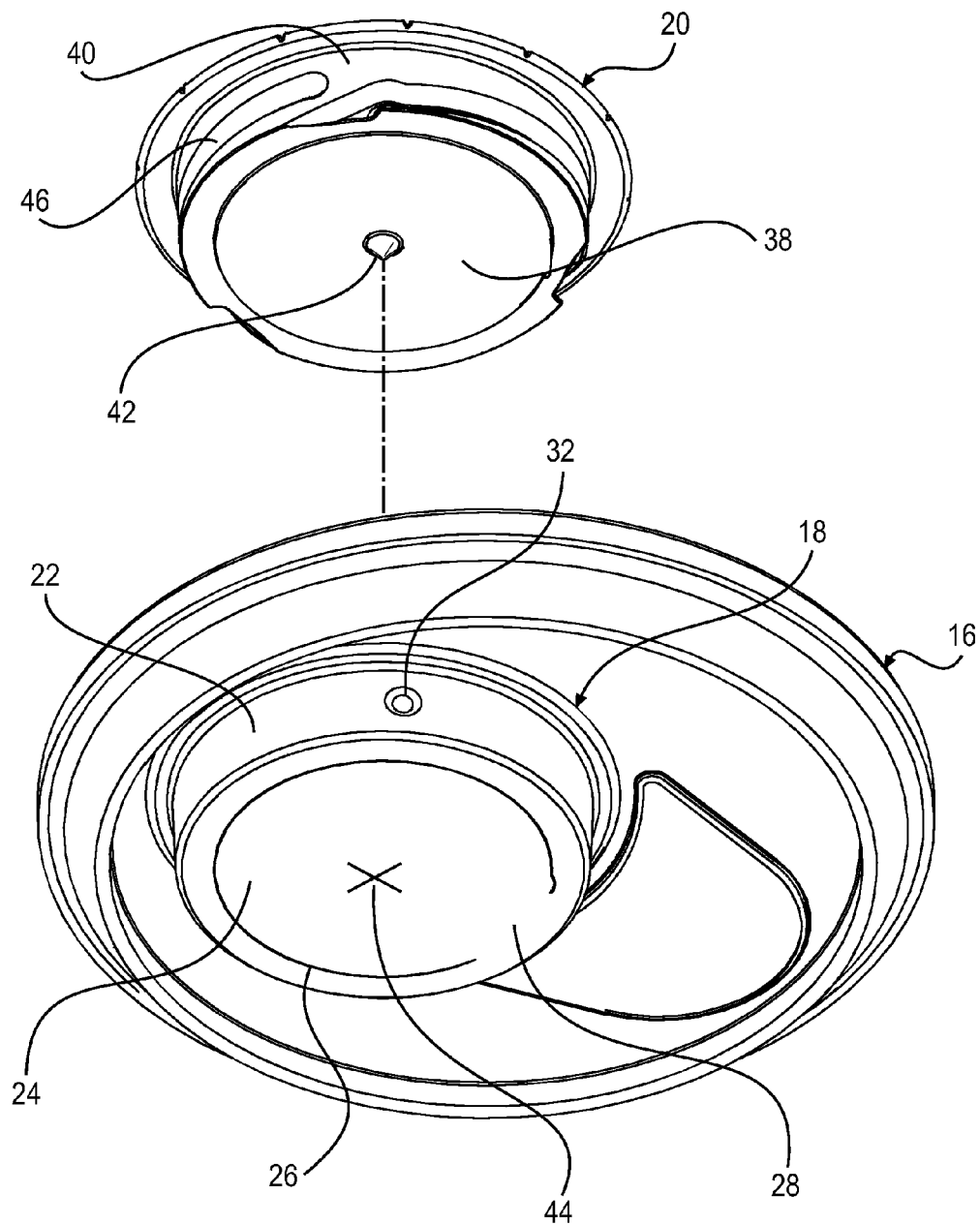
FIG. 5 is an enlarged, bottom elevation and exploded view of the lid and cap of the beverage container of FIGS. 1-4.

As seen in FIGS. 2, 3 and 5, the cylindrical sidewall 22 of the socket 18 has a plurality of equally spaced protrusions 32, disposed substantially on the same plane and being integrally formed in the sidewall 22. FIG. 5 shows one protrusion as an indentation or recess, since FIG. 5 shows the outer cylindrical sidewall of the socket 16, whereas the other Figures show the inner cylindrical sidewall 22 of the socket 16. The protrusions 32 cooperate with the cap 20 in a manner described below in order to open and reseal the container 10.

Figure 6:
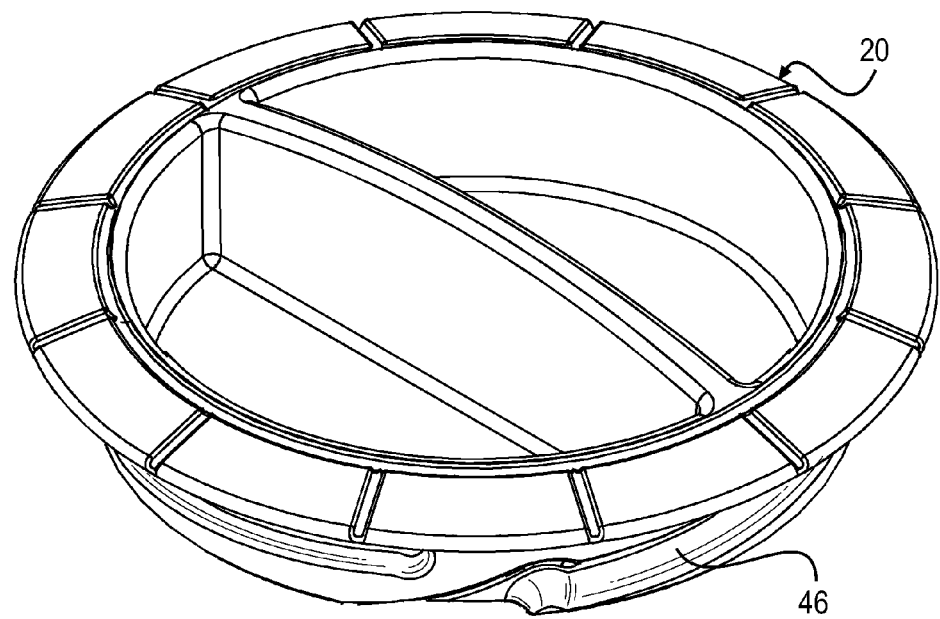
FIG. 6 is an enlarged, top side elevation view of the cap used in the previous figures.
Figure 7:
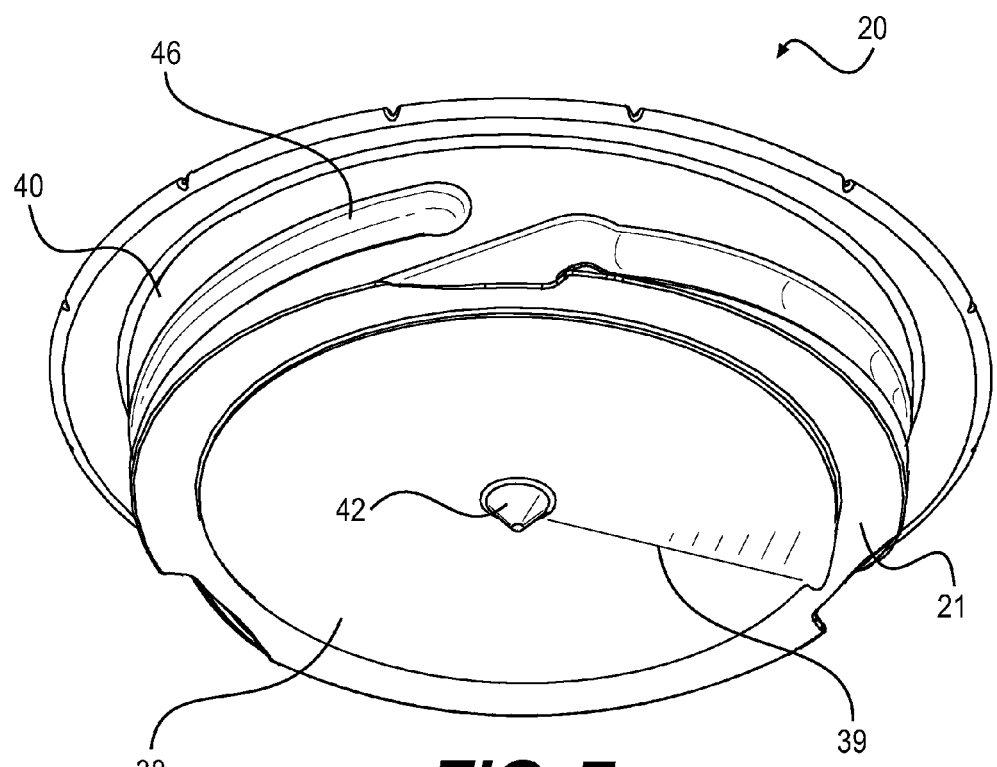
FIG. 7 is an enlarged, bottom side elevation view of the cap used in the previous figures.

Referring to FIGS. 5-7, the cap 20 has an upper, radially extending skirt 34 which acts as a tamper proof indicator. As seen in FIG. 1, prior to opening the beverage container 10, the skirt 34 seats flush with the flat outer surface 36 of the lid 16. The skirt is integrally formed with the cap 20, which is preferably made of plastic material. The skirt 34 includes a series of frangible score lines 34a, extending radially outwardly, which are operable to break during the opening operation of the can. The breaking of the score lines is effected by the skirt being driven downwardly as the cap is twisted or rotated and thereby advances downwardly into the socket 18. Opening of the beverage container will thus be evident by the broken score lines of the skirt 34, and preferably, by the sections of the skirt 34 that are formed by the broken score lines extending at an angle upwardly, thus extending radially outwardly and radially upwardly.

The cap 20 is preferably made of a molded plastic material, is sized to fit substantially within the socket 18, and includes a cam shaped bottom surface 38 formed at the lower or inner end of a substantially cylindrical sidewall 40. The cam shaped surface 38 may include an integrally formed sharp or pointed projection 39 disposed offset to the center axis of the cap 20 and extending downwardly into the socket 18 when the cap 20 is assembled in the socket 18. When assembled, the sharp projection 39 is disposed immediately above the score line 26, so that when the cap 20 moves downwardly during opening of the container 10, the projection 39 punctures the can at the beginning of the score line 26, next to the tab hinge 28, then progressively propagates the rupture along the score line 26 to its terminus on the opposite end of the tab hinge 28.

The cam shaped bottom surface 38 may also include a sharp or pointed projection 42 disposed on the center axis of the cap 20 and extending downwardly into the socket 18 when the cap 20 is assembled in the socket 18. When assembled, the projection is disposed immediate above an X-shaped score line 44, so that when the cap 20 moves downwardly during opening of the container, the projection punctures the can at the X-shaped score line 44, thereby relieving internal pressure and assisting in the rupturing of the score line 26 by the sharp projection 39.

The opening operation of the beverage container 10 is made possible by forming a cam structure between the socket 18 and the cap 20. In particular, cam surfaces 46 are formed in the cylindrical sidewall 40 of the cap 20. The projections 32 are fitted into and engage the cam surfaces 46 such that when the cap 20 is hand-twisted by the consumer, rotational motion of the cap 20 is converted into linear motion of the cap 20 thus driving the cap in a downward direction relative to the socket 18. As the cap 20 moves downwardly, the score line 26 is ruptured by the sharp projection 39, then progressively propagates the rupture along the score line 26 to its terminus. In an alternate embodiment, an optional X-shaped score line 44 may be ruptured by the projection 42 immediately before the score line 26 is ruptured by the sharp projection 39, to thereby relieve internal pressure and assist in the rupture of the score line 26 by the sharp projection 39.

Figure 8:
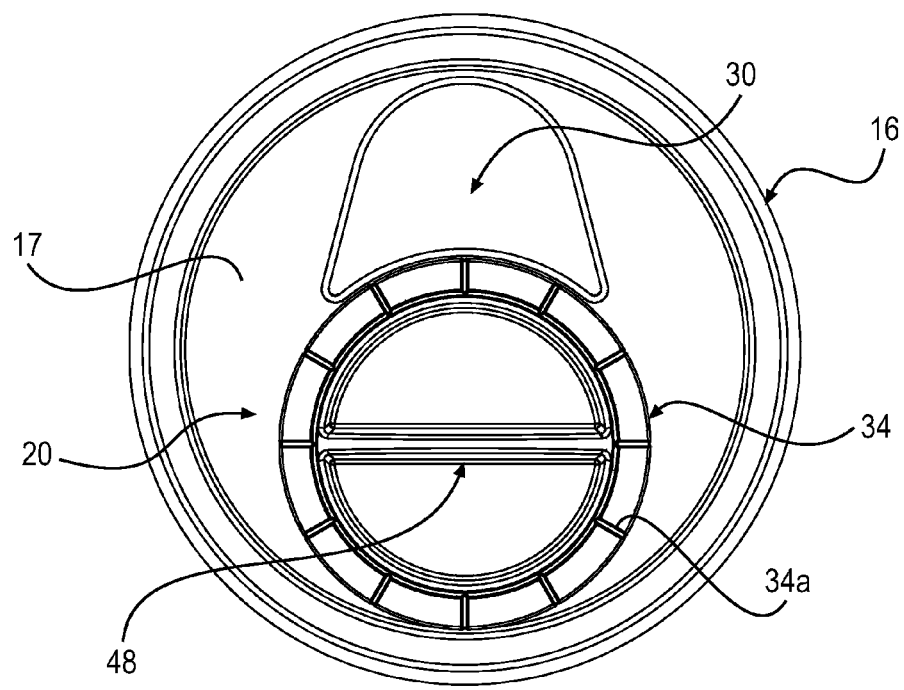
FIG. 8 is a top view of the beverage container of the previous figures, showing the cap in a pre-opened position.

As seen in FIG. 8, the cap 20 includes a grip element 48 for the consumer to grab when ready to open the beverage container, and also, as described below, for resealing the beverage container after opening. Depending on the contour of the cam surfaces and their direction of orientation, the cap can be rotated in one direction, preferably clockwise for opening, and then in the opposite direction, counterclockwise, to remove the cap during consumption of beverage, and then again back to the can-opening direction for resealing the beverage container if the contents are not entirely consumed. FIG. 9 shows the symmetry of disposition of the three projections 32, at approximately equal angular intervals of 120 degrees. Each projection engages a corresponding cam element, such that in the illustrated embodiment, the sidewall 40 of the cap 20 would be contoured, as by forming grooves, to form three cam elements 46a, 46b, and 46c. The cam elements are shaped and sloped in a manner designed to cause the cap 20 to advance into an opening position without more than a quarter to half a turn, and as measured in radians, this would be no more than 1 to 2 radians. The number of projections and cam elements can be varied, although three provides a balance between cost and effectiveness.

Figure 10:
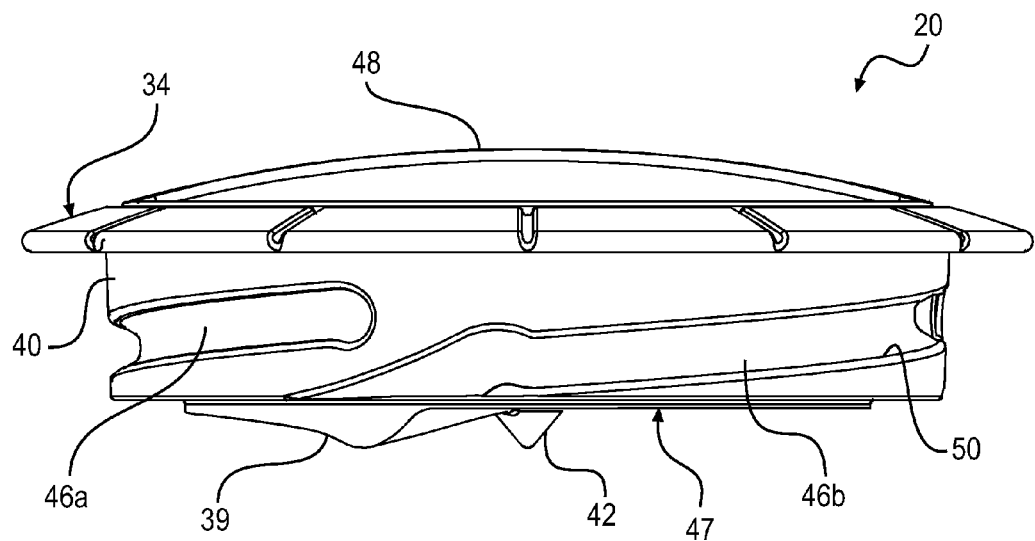
FIG. 10 is a side elevation view of the cap, enlarged to show the cam surfaces on the cylindrical sidewall of the cap.
Figure 11:
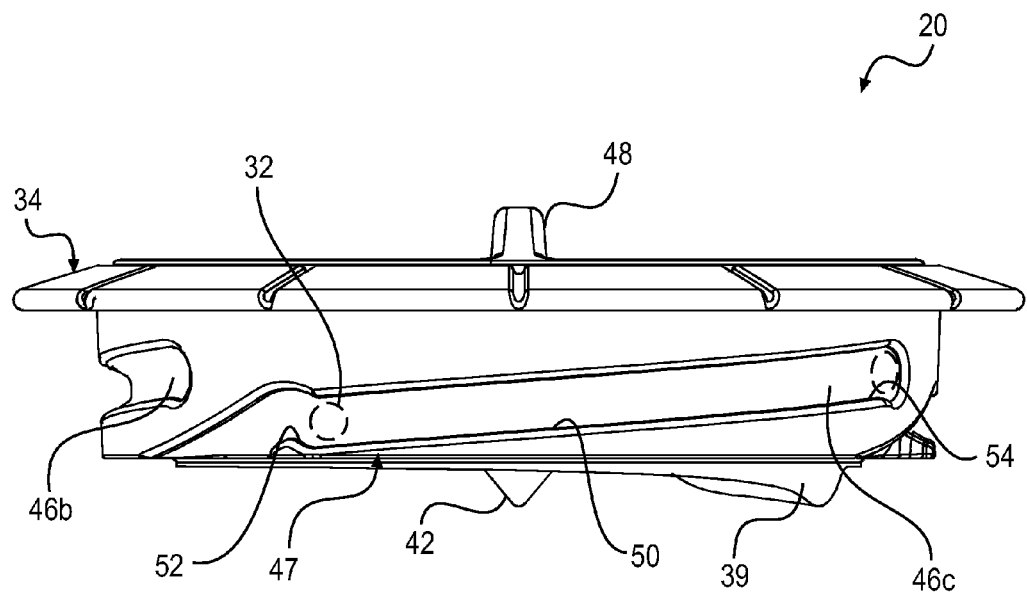
FIG. 11 is a side elevation view of the cap of FIG. 10, rotated 90 degrees.
Figure 12:
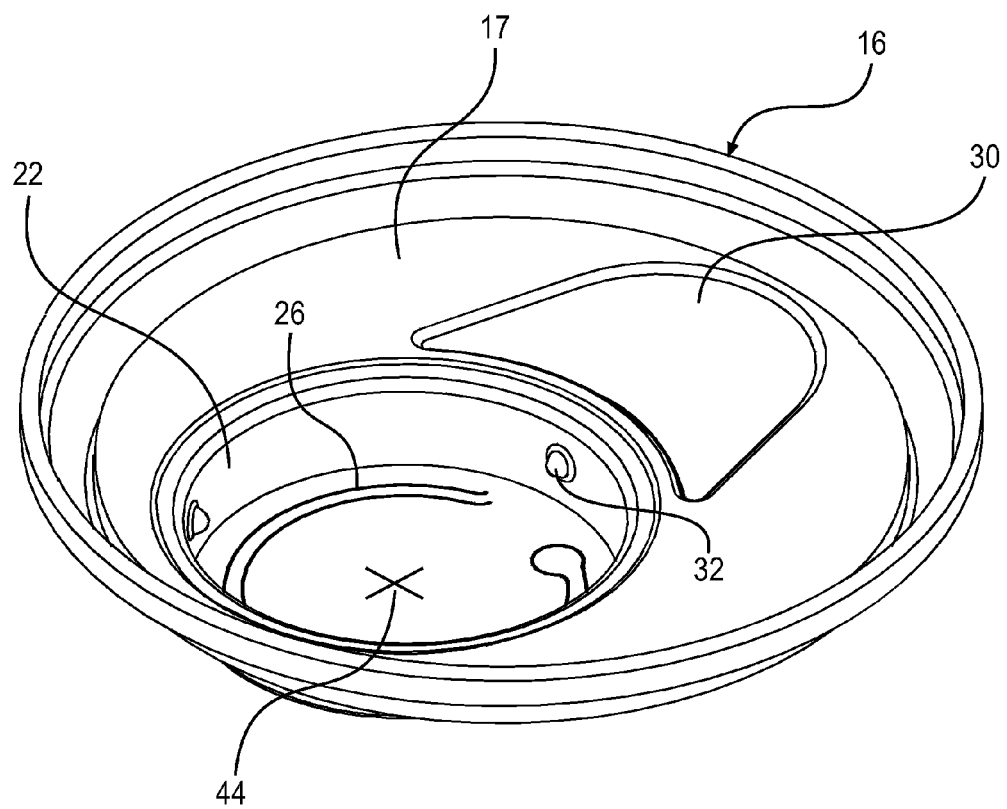
FIG. 12 is a top elevation view, showing the top of the beverage container, or lid, with the cap removed to expose features of the socket.

Referring to FIGS. 10 and 11, the cap sidewall 40 includes three equally spaced cam elements 46a, 46b and 46c. FIG. 10 shows the cam elements 46a and 46b and the grip 48 extending across the page. The bottom surface 47 of the cap 20 includes the projection 42, acting as a piercing element, which punctures the X-shaped score line 44, and it further includes a further projection 39 which also acts as a piercing element. The projection is designed and shaped to impinge on the bottom wall 24 of the socket 18 inside and juxtaposed the score line 26. As the cap 20 is rotated, from the unopened position shown in FIG. 10, the cam structure turns the rotational movement to translational movement, thus moving the cap inwardly. As the cap 20 moves inwardly, the projection 39 rotates until, preferably, it reaches the position shown in FIG. 11, wherein a portion of the bottom wall 24 breaks away and is pushed inwardly to form the tear panel 25 that remains hinged to the bottom wall 24 by virtue of the score line 26 not extending to a complete loop. The projection 39 starts at the beginning of score line 26 and only travels 90 deg. Thus, it will only have traveled a portion of the length. What pushes the tear panel 25 out of the way is the body of the cam shaped bottom surface 38 going past the plane of the socket 18 bottom wall 24. Notice that the cam shaped bottom surface 38 protrudes out from the flat annular surface 21.

Figure 13A:
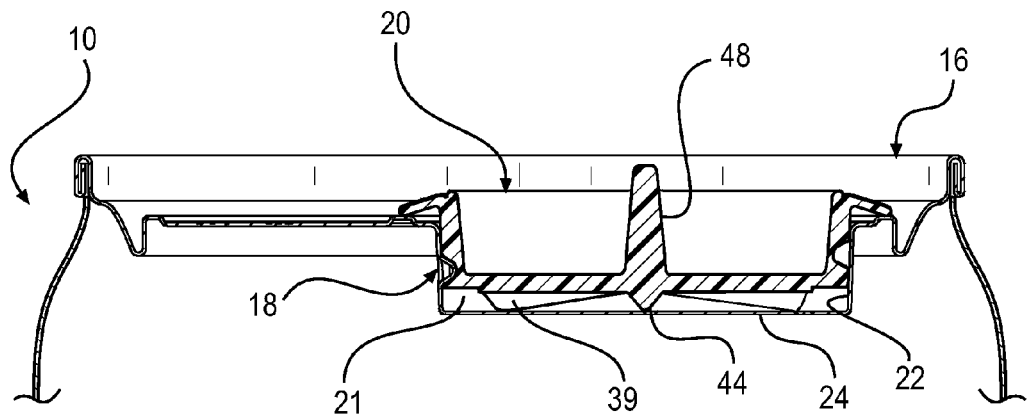
FIGS. 13A through 13D show cross sectional views of the cap moving sequentially between opening and resealing positions.

FIGS. 13A through 13D show a cross sectional view of the cap moving between opening and resealing positions. In FIG. 13A, the cap 20 is shown in cross section prior to opening the beverage container. Thus, the bottom wall 24 of the socket 18, the cylindrical sidewall 22 of the socket 18, and the upper horizontal wall 23 form the lid 16. As seen in FIG. 13A, the cap 20 is shown in the storage position, i.e., pre-opening of the can, wherein the socket bottom 24 is not punctured and the contents of the beverage can 10 are air tight for potentially long term storage. The grip element 48 is shown in a first, unopened position. In this position the flat annular surface 21 of the cap 20 is spaced above the socket bottom wall 24, but the projection 39 is close to or in slight contact with the score line 26. Similarly, if a second projection 42 is employed at the center of the lower end of the cap 20, it is also disposed in close proximity to the score line 44 if not slightly touching.

Figure 13B:
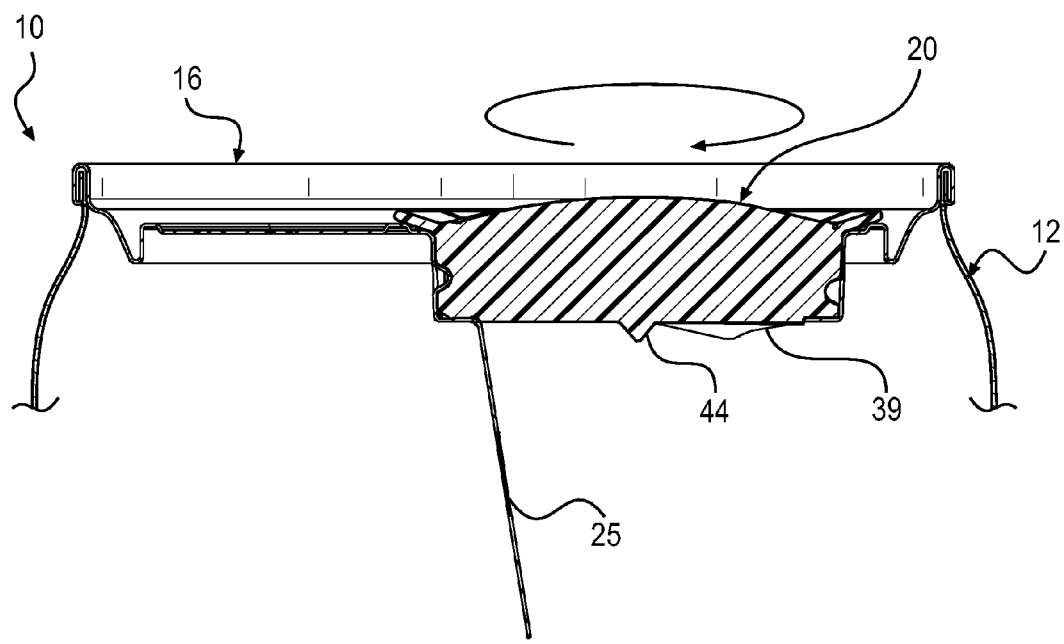

In FIG. 13B, the cap 20 is rotated clockwise approximately 90 degrees. Because of the cam surfaces, the cap translates downwardly by a distance sufficient to cause the projection 39 to rupture the score line 26 as the projection moves along the inner side of the score line. The rupture creates a tear panel 25 which is pushed by the projection into the can by rotating downwardly from the hinge 28 formed between the opposite ends of the score line 26. The opposite ends of the score line are positioned to form a pivot axis for the tear panel 25.

Figure 13C:
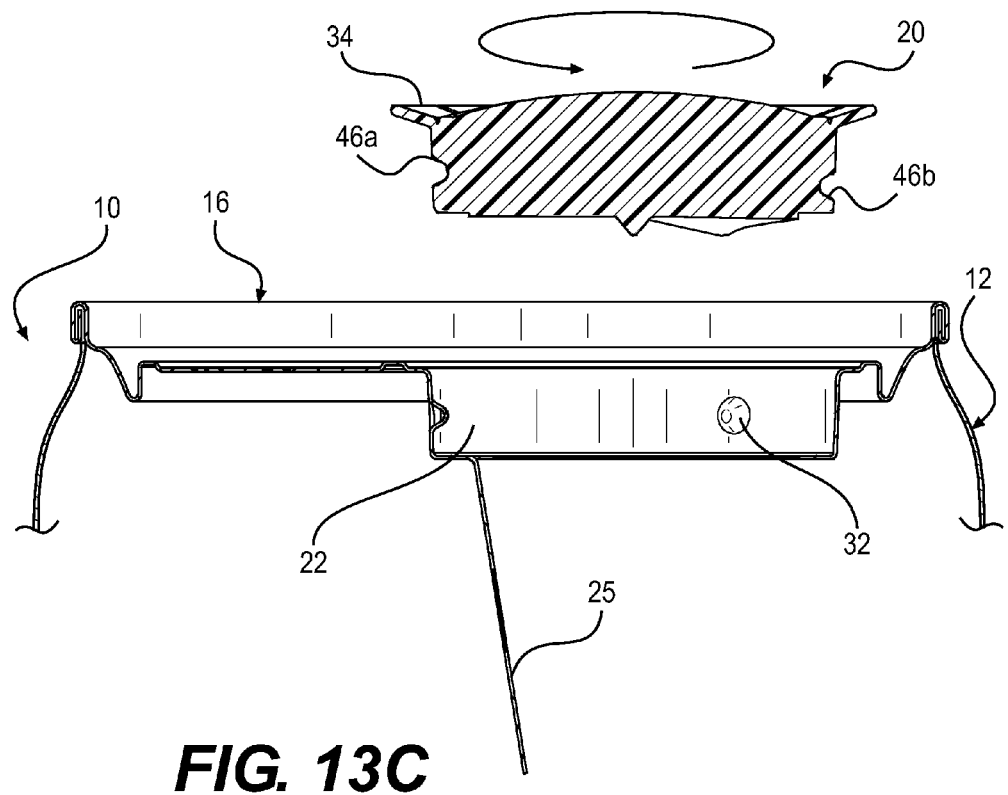

After the tear panel 25 is formed, and the cap is disposed at its innermost position relative to the socket, the consumer would then rotate the cap counterclockwise, preferably by turning the grip element 48. As seen in FIG. 13C, the cap 20 is shown separated from the beverage container 10, and can be pocketed by the consumer, or placed in a location for easy access in case the consumer chooses not to consume the entire contents of the beverage container 10. As evidence that the beverage container has been opened, the skirt 34 may be angled upwardly as a result of the frangible score lines being broken, so that individual sections of the skirt are now biased in an upward direction. Also, when rotating counterclockwise, the cam surfaces 46 and the projections 32 will eventually separate, allowing the cap 20 to be free of the beverage container 10.

Figure 13D:
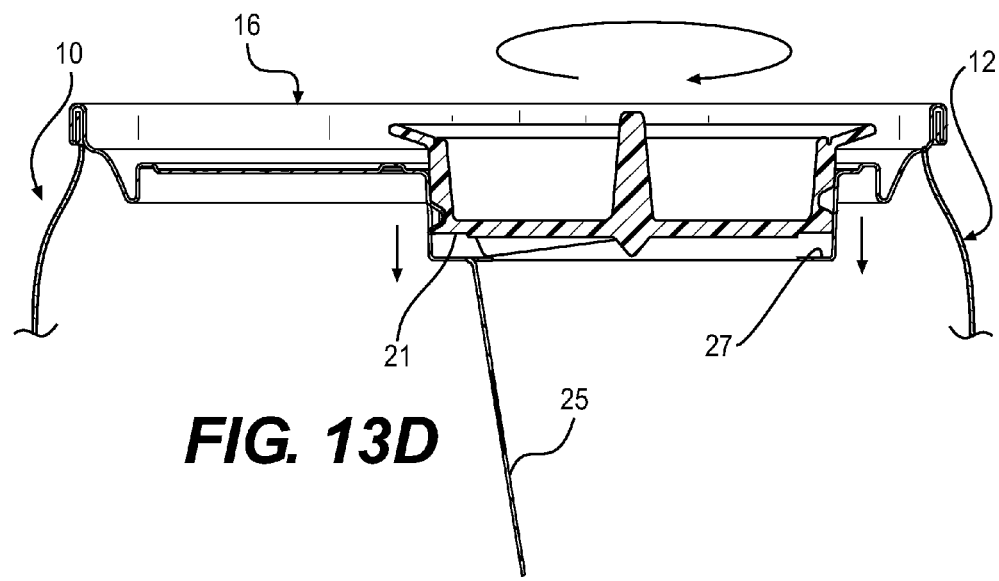

In the event that the consumer wishes to reseal the beverage container 10, and as seen in FIG. 13D, the cap 20 is brought into contact with the socket 18 by the consumer, by bringing the cam surfaces 46 into engagement with the projections 32. Once this occurs, clockwise rotation will cause the cap 20 to translate downwardly until a sealing, seating arrangement is made between the annular surface 27 of the socket bottom wall 24 and the annular surface 21 of the cap 20, thereby keeping the contents of the beverage container fresh and safe from foreign contaminants.

The cap 20 can be removed again and again to gain access to the contents of the beverage container until all contents are consumed. There is no limit to the type of beverages that can be housed in the container 10, but most commonly "canned" beverages include sodas, beer, juices, etc. It is also within the scope of the present invention that the contents of the containers could be foodstuff, and non-consumable liquids, gels, powders, etc.

The cam means disclosed herein can be used for caps that provide other functionality for the beverage can 10. For example, a variation of the cap 20 would be one that could include a passageway extending through the cap 20 with drinking implements formed at the upper, outer end, such as a child's sip cup, which would allow a child to drink from the beverage container 10 without spilling. Alternatively, the cap 20 could be formed with an infant nipple for feeding formula, juice, water or other beverages suitable for infants. When using drinking implements such as sip cup and baby bottle nipples, a cap 20 would nonetheless have to be employed for opening the container, and then a second "cap" could be used for consuming the contents. In any event, the opening caps and drinking implements could be sold separately from the beverage container, as long as the container included the projections formed in the cylindrical sidewall of the socket.

Although a wide range of plastic materials could be used to form the cap 20, other materials could be used, including ceramics and metals. However, for harder materials such as these, it may be necessary to position a gasket between the opposing annular surfaces of the socket and the cap to ensure the best possible seal.

While the embodiments described herein place the socket and cap in the top of the beverage can, it is possible to have the same opening and resealing structures in the bottom surface 14 of the beverage container 10. Also, while a cylindrical can has been described herein, other shapes of containers, e.g., oval, rectangular, etc., could also be used.

The preferred shape of the frangible score line 26 in the bottom of the socket 18 is circular, with a closed end and an open end. The inside score (shallower line) terminates in a curve arcing towards the socket's cylindrical sidewall to prevent loss of tear panel into the container. The outside score line (deeper line) terminates in circular form spaced from the inside score line. There is a hinged portion of the tear panel that keeps the panel in contact with the lid once ruptured, as described above.

The projection 39, described as a piercing element, is intended to be a single point of contact that moves deeper, and radially along the inside of the score line 26 while the cap 20 is rotated. The projection 39 may also include additional areas to further drive the tear panel 25 deeper into the container. A single point will apply more force to breaking the tear panel but additional areas acting in a secondary fashion could help in the opening process.

The projections 32 used in the socket allow the use of a very shallow socket (as compared to threaded designs) and still provide positive opening, closing and sealing of the cap 20. The design of the projections 32 also provides for positive stops for open, closed and removable cap positions. As seen in FIGS. 10 and 11, each cam element 46a, 46b and 46c includes a sloped portion 50, a lower detent 52 and an upper detent 54. Once assembled, the three projections 32 are respectively positioned so that the detents prevent the cap 20 from becoming disconnected from the socket 18, during transport or storage, and from backing off a sealing position, when the cap 20 is positioned in a resealing position. This can be illustrated with reference to FIG. 11, where the projection 32 is shown as a broken line circle. When the cap 20 is in the unopened position, each projection 32 will be positioned next to the lower detent 52, as seen with the broken line circle 32. The detent 52 prevents the cap 20 from turning to a position where the projection 32 is disengaged from the cam element 46c, as for example, if vibration or the like caused the projection to pass out of the sloped portion 50. Similarly, when the cap 20 is intentionally rotated clockwise, to either open or reseal the beverage container, the projection passes over the upper detent 54 to become locked by interference fit between the detent and the projection. The upper detent thus prevents the cap 20 from inadvertently backing out of the sealing position. Thus, the cap 20 is held in two positions by the detents. The first position can be called a transport securement position and the second can be called a closed position. The distance between the two detents, measured along the rotational axis of the cap 20 is equal to the distance between the resealing surface on the cap 20 and the socket's bottom surface. The transport securement detent, or lower detent 52 restricts the rotary movement of the cap 20 due to the interference between the stabilizing skirt 34 and the flat upper rim of the socket 20, as well as the interference between the piercing element or projection 39 and the socket tear panel 25.

When turning the cap 20 in the opening direction, e.g., clockwise, the projections 32 on the socket's cylindrical sidewall follow the sloped portions 50 of the cam elements 46, which form gradual ramps, and this causes the rotary motion of the cap 20 to be converted to linear or translational movement which drives the cap 20 into the container. This engages the piercing element 39 against the tear panel 25 and provides the force necessary to rupture the frangible score line 26. Further turning of the cap 20 in the opening direction progressively pushes the tear panel 25 out of the way and into the container, until the projections 32 reach the closed position of the upper detents 54. A slightly higher point on the sloped portion 50 of the cam elements 46 just before the closed position provides the resistance necessary to keep the cap from backing out.

When turning the cap 20 opposite the opening direction, the projections 32 follow the same route to their starting positions but after opening, the projections 32 can pass over the transport securement or lower detents 52 because the stabilizing skirt 34 and the tear panel 25 are now not providing any interference between the transport securement or lower detents 52 and the void between the cam elements 46, allowing the cap 20 to be freed from the container.

In the embodiments described and illustrated herein, the cam elements 46 are seen as grooves having a sloped portion that terminated at opposite upper and lower ends in a detent, whereby the entire cam elements were formed in the cylindrical sidewall 40 of the cap 20. It is equally possible to form the cam elements as projections from the surface, integrally formed therewith, or as separate parts connected to the cap. Further, while the projections 32, acting as cam followers, project from the cylindrical sidewall of the sockets, the socket could have been formed with cam surfaces and the cam followers could have been formed on the cap 20. The exact size and shapes of the cam surfaces can be selected to correspond to the particular needs of the beverage container. The overall goal is to select a structure that results in an operable torque which can be applied by consumers without exerting excessive effort.

Figure 14:
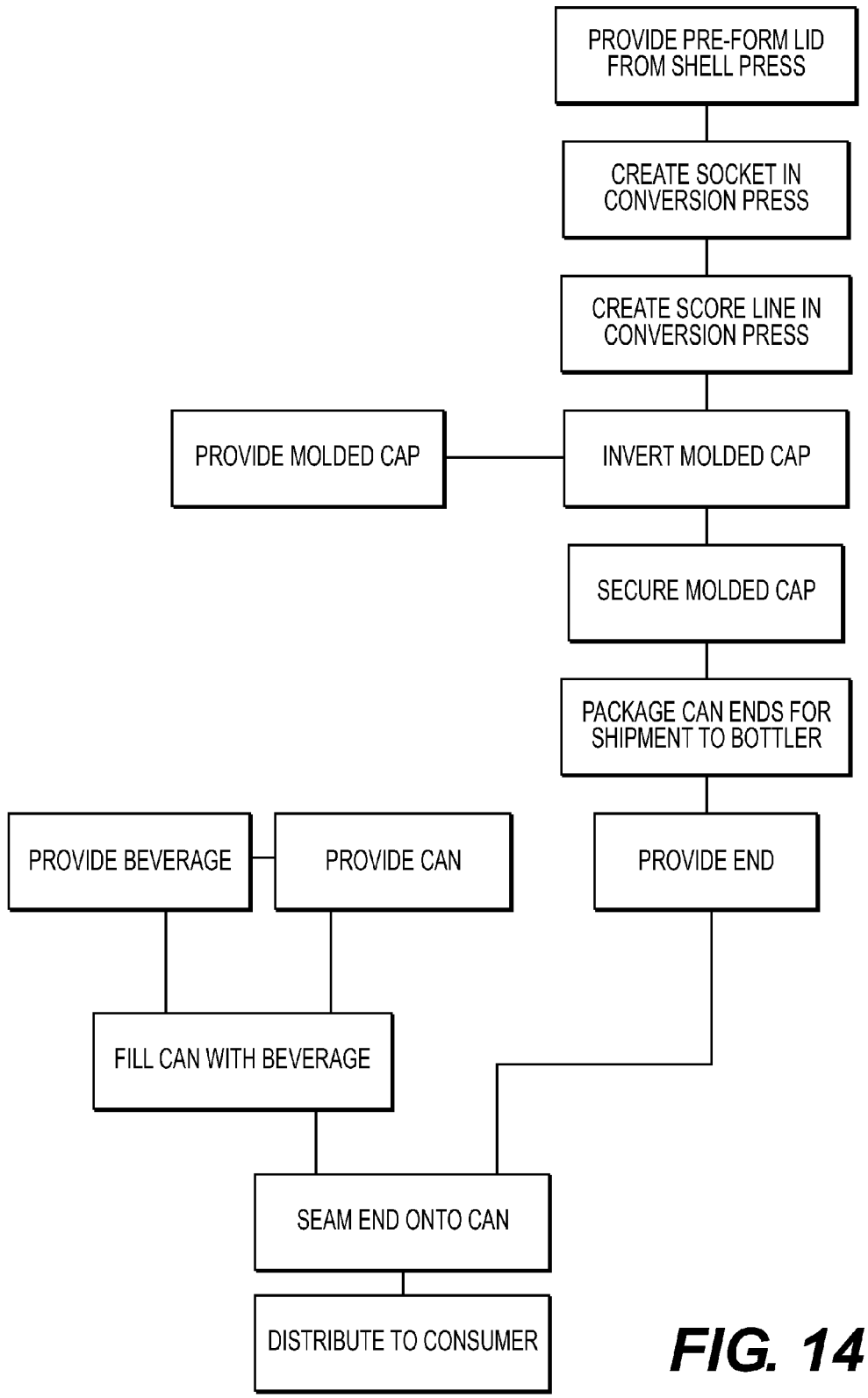
FIG. 14 is a flow chart showing manufacturing steps according to one aspect of the present invention.

The structures described above can be made using unique manufacturing processes, which combine some of the known processing steps with new, modified or avoided steps. In one particularly preferred method of making beverage containers, as illustrated in the flow chart of FIG. 14, preformed lids are provided from a shell press. Next, sockets are formed in the lids in a conversion press. Next, a score line is formed in the bottom of the socket in the conversion press, either at the same time, or sequentially after the socket is formed. Caps are formed by injection molding, or other suitable means, and the caps are supplied to the assembly line, where they are inserted into the sockets. The caps are then secured to the sockets by press forming the projections by spacing three dies around the socket, all centered on a common plane. The dies are pressed inwardly against the cylindrical sidewall of the socket, and the cap acts as a mandrel against the inner pressing force of the dies, thus forming the projections 32 to project into the grooves of the cam elements. The can lids or ends are then packaged and sent to bottlers, who can then use conventional processing steps to secure the lid to any of a variety of cans or other beverage containers.

The process described above achieves several cost and environmental advantages over the prior manufacturing techniques. First of all, the lid does not have to be processed to form a rivet, which has conventionally been used to secure the pull tab to the can lid. There is no need for a rivet because there is no need for a pull tab. The rivet required the lid to be made of stronger, thicker material, usually consisting of a different alloy of aluminum as opposed to the material that made up the sidewall and bottom. Moreover, the conventional process would have required the formation of a pull tab, likely to be made of third, different aluminum alloy. Use of three different aluminum materials presented a problem for recycling, whereas in the present invention, a single material can be used to form the can body and the can lid.

Figure 15:
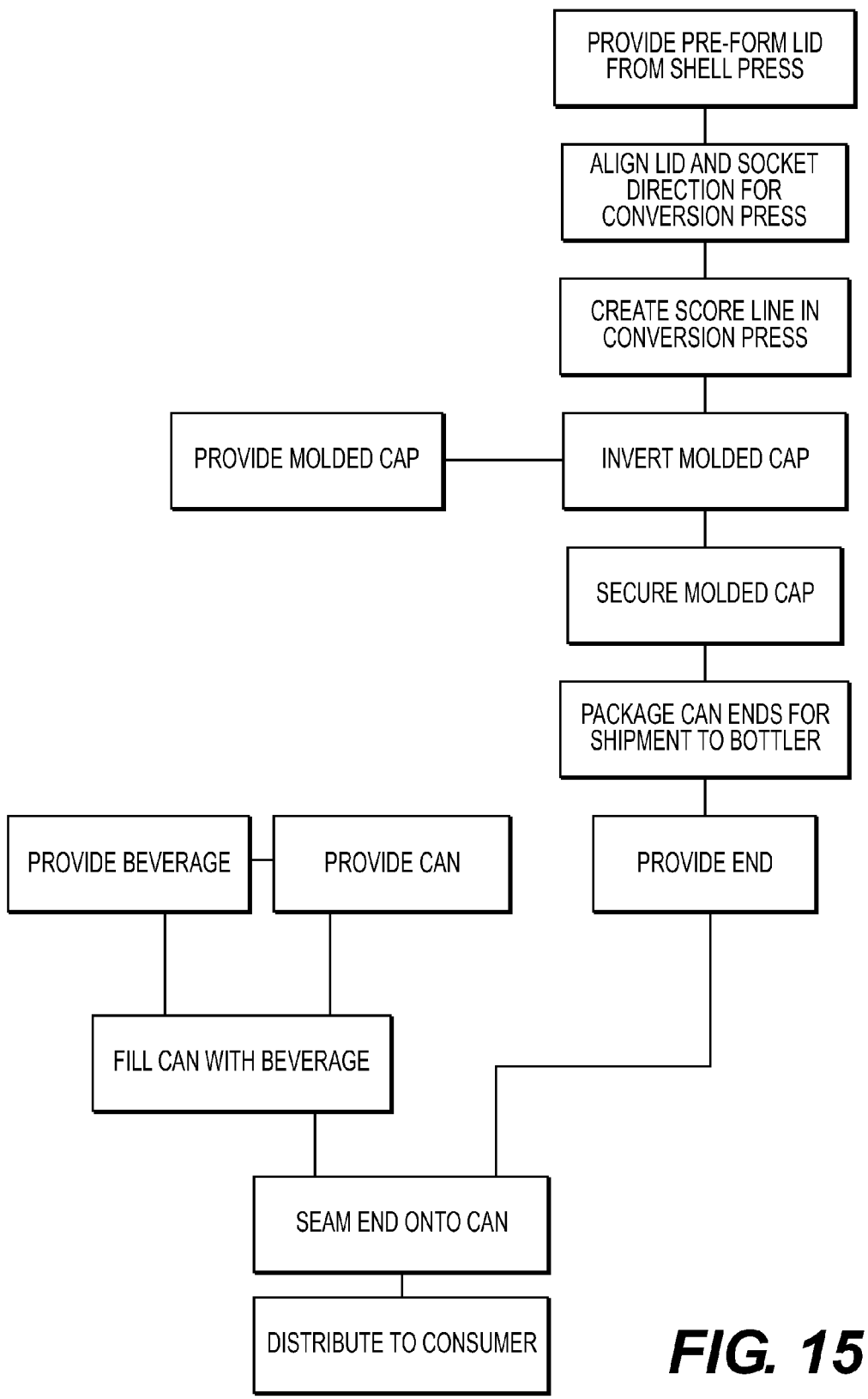
FIG. 15 is a flow chart showing manufacturing steps according to another aspect of the present invention.
Figure 16:
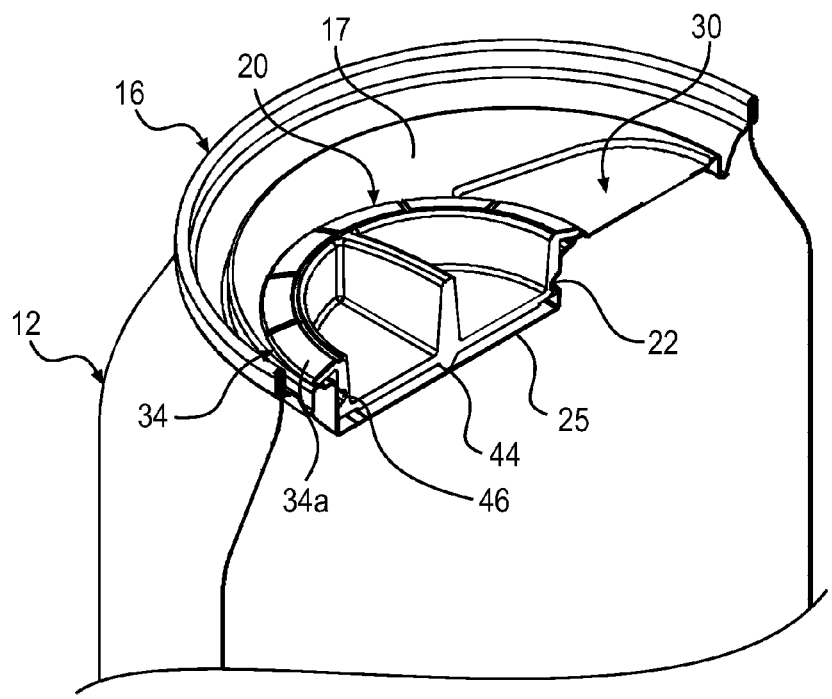
FIG. 16 is a partial cutaway, partial section of the beverage container of the previous drawings.
Figure 17:
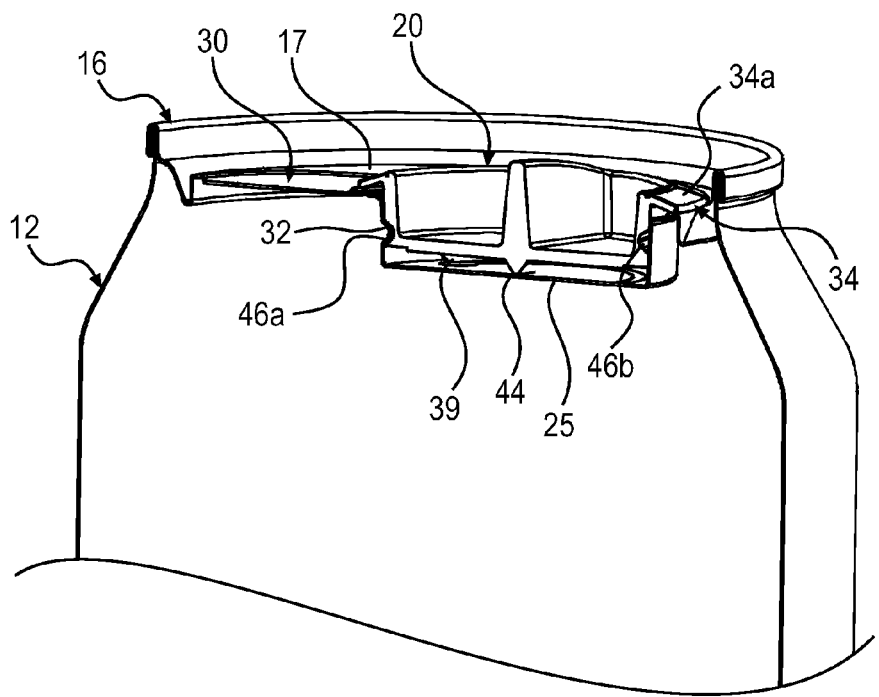
FIG. 17 is the same view as FIG. 16, but from a different point of view.

Referring to FIG. 15, a further variation of manufacturing process is disclosed. In the first step a pre-formed lid is provided from a shell press with a socket already formed. In the next step, the lid and socket are aligned directionally for a conversion press. Next a score line is created in the conversion press, at the bottom of the socket. Molded caps are provided to the assembly line, and inserted into the molded cap. The molded caps are secured to the socket by forming the projections 32 in a manner described above, in which the cap functions as a mandrel during formation of the projections. Next, the lids with secured caps are packaged and shipped to bottlers or others for conventional filling, sealing, and shipment to customers. As in the previously described manufacturing process, there is no need to form a rivet in the lid, and no need to attach a pull tab to the rivet. Avoiding these steps saves money and makes the resulting product easier to recycle.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A beverage container comprising:
    a container body having a sidewall defining a tubular section extending between a top edge and a bottom end, a bottom wall providing a seal across the sidewall bottom end, and an opening defined by the sidewall top edge; and
    a lid for a beverage container, comprising:
        a substantially planar member having a peripheral edge;
        a socket formed near the peripheral edge of the planar member and having a cylindrical sidewall and a bottom wall;
        a score line disposed in the bottom wall of the socket and defining a tear panel, wherein the score line is located inward from the cylindrical sidewall, defining an annular surface between the score line and the cylindrical sidewall providing a seating arrangement segment, and whose start and end do not meet to define a hinge for the tear panel;
        a hinge section defined by ends of the score line, wherein the hinge section extends between the tear panel and the annular surface maintaining attachment of the tear panel to the planar member when the score line is fractured;
        a cap having a bottom surface extending across a lower edge of a cylindrical sidewall, the cap movably disposed in the socket, locating the cap bottom surface adjacent the bottom wall of the socket, the cap comprising a pointed projection extending downward from the cap bottom surface and disposed offset to a center axis of the cap, wherein when the cap is assembled in the socket, the pointed projection extends downwardly into the socket and is disposed immediately above the score line; and
        an earn feature for driving the cap between opening, removal and resealing positions relative to the score line, the earn feature comprising at least one earn surface in cooperative engagement with a cam feature, wherein the earn feature translates a rotational motion into a linear motion substantially perpendicular to a plane defined by the rotational motion,
    wherein the lid is assembled to the container body by joining the peripheral edge of the planar member to the top edge of the sidewall creating a sealed beverage container.

2. The beverage container of claim 1, wherein the container body is substantially cylindrical and the sidewall and bottom wall are integrally formed, and
    wherein the cap fits substantially within the socket, and
    wherein the cam feature comprises earn surfaces formed in one of the cylindrical sidewalls of the socket and the cap, and at least one projection formed in the other of the cylindrical sidewalls of the socket and the cap.

3. The beverage container of claim 1, the lid further comprising a hinge section defined by ends of the score line, wherein the section extends between the tear panel and the annular surface maintaining attachment of the tear panel to the planar member when the score line is fractured.

4. The beverage container of claim 1, wherein the cap has an upper end having a peripheral edge, and the cap includes a skirt formed along the peripheral edge, the skirt including an opened indicating feature for visually indicating when beverage container has been opened.

5. The beverage container of claim 4, wherein the opened indicating feature includes score lines formed radially outwardly at spaced intervals along the skirt, wherein the score lines are broken to allow movement of the skirt when the cap moves downwardly.

6. The beverage container of claim 1, wherein the body is substantially cylindrical and the bottom wall is integrally formed with the sidewall.

7. The beverage container of claim 6, wherein the bottom wall, sidewall and lid are all made of the same material.

8. The beverage container of claim 7, wherein the material is an aluminum alloy.

9. The beverage container of claim 1, the lid further comprising a socket adapted to receive the cap and an earn feature, wherein the earn feature includes elements formed on opposing cylindrical surfaces of the socket and cap.

10. The beverage container of claim 9, wherein each earn surface is formed on an outer cylindrical surface of the cap, and projections are formed on the inner cylindrical surface of the socket, wherein each earn surface is adapted to engage the projections whereby rotational movement of the cap imparts translational movement to the cap.

11. The beverage container of claim 10, wherein-the cap has an upper end and a lower end, and the tear panel is shaped defining a flap that opens when the pointed projection is driven downwardly by the earn feature to impinge upon the score line.

12. The beverage container of claim 11, wherein the score line is a first score line and further comprising a central piercing element formed near the center of the lower end of the cap, a second score line formed in the middle of the tear panel and juxtaposed the central piercing element, wherein a downward motion of the cap causes the central piercing element to pierce the center of the tear panel to release internal pressure and thereby facilitate breaking of the first score line by the pointed projection.

13. The beverage container of claim 11, the cap further comprising a grip element formed in the upper end of the cap.

14. The beverage container of claim 1, further comprising a detent feature for securing the cap in a first position associated with pre-opening, and a second position associated with post-opening.

15. The beverage container of claim 14, wherein the detent feature is associated with the cam feature.

16. The beverage container of claim 15, wherein pre-opening position is associated with functions of storage and transport, and the post-opening position is associated with resealing.

17. The beverage container of claim 15, wherein the detent feature includes at least a portion of the earn feature.

18. The beverage container of claim 17, wherein the cam feature includes earn elements formed on the cap which engage earn followers formed in the cylindrical sidewall of the lid, and
   wherein the detent feature include detents formed in the cam elements which cooperate with the cam followers to hold the cap in the pre-opening and post opening positions.

19. A lid for a beverage container, comprising:
   a substantially planar member having a peripheral edge;
   a socket formed near the peripheral edge of the planar member and having a cylindrical sidewall and a bottom wall;
   a score line disposed in the bottom wall of the socket and defining a tear panel, wherein the score line is located inward from the cylindrical sidewall, defining an annular surface between the score line and the cylindrical sidewall providing a seating arrangement segment;
   a cap having a bottom surface extending across a lower edge of a cylindrical sidewall, the cap movably disposed in the socket, locating the cap bottom surface adjacent the bottom wall of the socket, the cap comprising a pointed projection extending downward from the cap bottom surface and disposed offset to a center axis of the cap, wherein when the cap is assembled in the socket, the pointed projection extends downwardly into the socket and is disposed immediately above the score line; and
   an earn feature for driving the cap between opening, removal and resealing positions relative to the score line, the earn feature comprising at least one earn surface in cooperative engagement with a cam feature, wherein the earn feature translates a rotational motion into a linear motion substantially perpendicular to a plane defined by the rotational motion.

20. The lid of claim 19, wherein the cap fits substantially within the socket, and
   wherein the cam feature comprises cam surfaces formed in one of the cylindrical sidewalls of the socket and the cap, and at least one projection formed in the other of the cylindrical sidewalls of the socket and the cap.

21. The lid of claim 19, wherein the score line is shaped initiating at a looped segment and having a pair of line segments extending from each end of the looped segment, the pair of line segments extending in a like direction generally following a peripheral edge of the socket bottom wall.

22. The lid of claim 19, wherein the score line is shaped initiating at a looped segment and having a pair of line segments extending from each end of the looped segment, the pair of line segments extending in a like direction generally following a peripheral edge of the socket bottom wall, wherein the pointed projection is in alignment with a center of the looped segment of the score line.

23. The lid of claim 19, wherein the cap and lid form a seal between at least one of:
   the seating arrangement of the socket and the lower surface of the cap, and
   an upper surface of the substantially planar member and a contacting surface of a flange extending radially outward from a peripheral edge about the cap.

24. The lid of claim 19, further comprising a hinge section defined by ends of the score line, wherein the hinge section extends between the tear panel and the annular surface maintaining attachment of the tear panel to the planar member when the score line is fractured.

25. The lid of claim 19, wherein the earn feature includes earn surfaces formed on an outer cylindrical surface of the cap, and projections formed on the inner cylindrical surface of the socket,
   wherein the earn surfaces are adapted to engage the projections whereby rotational movement of the cap imparts translational movement to the cap.

26. The lid of claim 25, wherein the cap has an upper end a lower end, the tear panel opening when the pointed projection is driven downwardly by the earn feature to impinge upon the score line.

27. The lid of claim 26, wherein the score line is a first score line, the cap further comprising a central piercing element formed near a center of the lower end of the cap, a second score line formed in the middle of the tear panel and juxtaposed the central piercing element, wherein downward motion of the cap causes the central piercing element to pierce the second score line to release internal pressure and thereby facilitate breaking of the first score line by the pointed projection.

28. The lid of claim 27, wherein the cap includes a grip clement formed in the upper end of the cap.

29. The lid of claim 19, further comprising a detent feature for securing the cap in a first position associated with pre-opening, and a second position associated with post-opening.

30. The lid of claim 29, wherein the detent feature are associated with the cam feature.

31. The lid of claim 30, wherein pre-opening position is associated with functions of storage and transport, and the post-opening position is associated with resealing.

32. The lid of claim 31, wherein the detent feature includes at least a portion of the earn feature.

33. The lid of claim 32, wherein the earn feature includes cam elements formed on the cap which engage cam followers formed in the cylindrical sidewall of the lid, and
   wherein the detent feature includes detents formed in the cam elements which cooperate with the cam followers to hold the cap in the pre-opening and post opening positions.

34. A method of opening and resealing a beverage container, comprising steps of:
   obtaining a beverage container comprising:
      a container body having a sidewall defining a tubular section extending between a top edge and a bottom end, a bottom wall providing a seal across the sidewall bottom end, and an opening defined by the sidewall top edge; and
      a lid for a beverage container, comprising:
         a substantially planar member having a peripheral edge;
         a socket formed near the peripheral edge of the planar member and having a cylindrical sidewall and a bottom wall;
         a score line disposed in the bottom wall of the socket and defining a tear panel, wherein the score line is located inward from the cylindrical sidewall, defining an annular surface between the score line and the cylindrical sidewall providing a seating arrangement segment;

a hinge section defined by ends of the score line, wherein the hinge section extends between the tear panel and the annular surface maintaining attachment of the tear panel to the planar member when the score line is fractured;

a cap movably disposed in the socket and adjacent the bottom wall of the socket, the cap having a grip at one end and a pointed projection at an opposite end, wherein the pointed projection is disposed offset to the center axis of the cap, wherein when the cap is assembled in the socket, the pointed projection extends downwardly into the socket and is disposed immediately above the score line; and an earn feature for driving the cap between opening, removal and resealing positions relative to the socket bottom wall, the earn feature comprising at least one earn surface in cooperative engagement with a cam feature, wherein the earn feature translates a rotational motion into a linear motion substantially perpendicular to a plane defined by the rotational motion, wherein the lid is assembled to the container body by joining the peripheral edge of the of the planar member to the top edge of the sidewall creating a sealed beverage container;

providing cam surfaces and cam followers respectively on the cap and the lid;

movably connecting the cap to the lid through the earn surfaces and cam followers;

twisting the cap in a first direction and allowing the cam surfaces to convert rotational movement of the cap to linear motion in a direction generally perpendicular to a plane of rotation, whereby linear motion of the cap pushes the pointed projection into the score line to a degree shearing the bottom panel along the score line breaking the tear panel from the lid and enter the beverage container, thereby forming an opening suitable for drinking a beverage stored within the beverage container;

twisting the cap in a second, reverse direction to an extent that the cam followers are disengaged from the earn surfaces, thereby allowing removal of the cap;

re-engaging the cam followers and cam surfaces; and twisting the cap in the first direction until the cap is seated over the drinking opening.

35. The method of opening and resealing a beverage container of claim 34, further comprising a hinge section defined by ends of the score line, wherein the hinge section extends between the tear panel and the annular surface, further comprising steps of:

maintaining attachment of the tear panel to the planar member when the score line is fractured; and causing the tear panel to bend along the hinge section.

* * * * *